United States Patent [19]
Wallmeier et al.

[11] Patent Number: 5,436,894
[45] Date of Patent: Jul. 25, 1995

[54] METHOD AND CIRCUIT ARRANGEMENT FOR SETTING UP VIRTUAL CONNECTIONS VIA AN ATM TRUNK GROUP

[75] Inventors: Eugen Wallmeier; Helga Hofstetter, both of Munich, Germany

[73] Assignee: Siemens Aktiengesellschaft, Munich, Germany

[21] Appl. No.: 213,369

[22] Filed: Mar. 15, 1994

Related U.S. Application Data

[63] Continuation of Ser. No. 913,969, Jul. 17, 1992, abandoned.

[30] Foreign Application Priority Data

Jul. 19, 1991 [EP] European Pat. Off. ............ 91112113

[51] Int. Cl.$^6$ .............................................. H04J 3/12
[52] U.S. Cl. .................................... 370/60.1; 370/94.2
[58] Field of Search .................... 370/54; 340/825.03, 340/826

[56] References Cited

U.S. PATENT DOCUMENTS

| | | | |
|---|---|---|---|
| 5,124,978 | 6/1992 | Chao | 370/60 |
| 5,132,966 | 7/1992 | Hayano | 370/79 |
| 5,153,877 | 10/1992 | Esaki et al. | 370/85.6 |

FOREIGN PATENT DOCUMENTS

| | | |
|---|---|---|
| 0411674 | 6/1990 | European Pat. Off. . |
| 0398037 | 11/1990 | European Pat. Off. . |

OTHER PUBLICATIONS

Joos et al. "A Statistical Bandwidth Allocation and Usage Monitoring Algorithm for ATM Networks", IEEE International Conference on Communications, vol. 1, Jun. 11-14, 1989, pp. 0415-0422.

Wang et al. "Bandwidth Allocation for ATM Networks", IEEE International Conference on Communications, vol. 2, 1990, pp. 0439-0442.

Sato et al, "Broad-Band ATM Network Architecture Based on Virtual Paths", IEEE Transactions on Communications, vol. 38, No. 8, Aug. 1990, pp. 1212-1222.

Primary Examiner—Douglas W. Olms
Assistant Examiner—Huy D. Vu
Attorney, Agent, or Firm—Hill, Steadman & Simpson

[57] ABSTRACT

A method and circuit arrangement for connecting ATM communication equipment to an ATM trunk group, where characteristic parameters reported for virtual connections to be set up are allocated to connection classes and to transmission classes corresponding to the connection classes. The parameters are defined for the individual lines of the ATM trunk group. Further, line particulars with respect to all of the transmission classes for which a virtual connection can still be set up, based on currently available free transmission capacity, are individually retained for the associated individual ATM trunks. When a request for setting up a virtual connection is present, an individual trunk for setting up the virtual connection is selected during the course of a search event involving the line particulars of all individual trunks. A transmission class that corresponds to the connection class to be considered in the virtual connection to be set up is determined from the line particulars of the individual trunk.

16 Claims, 2 Drawing Sheets

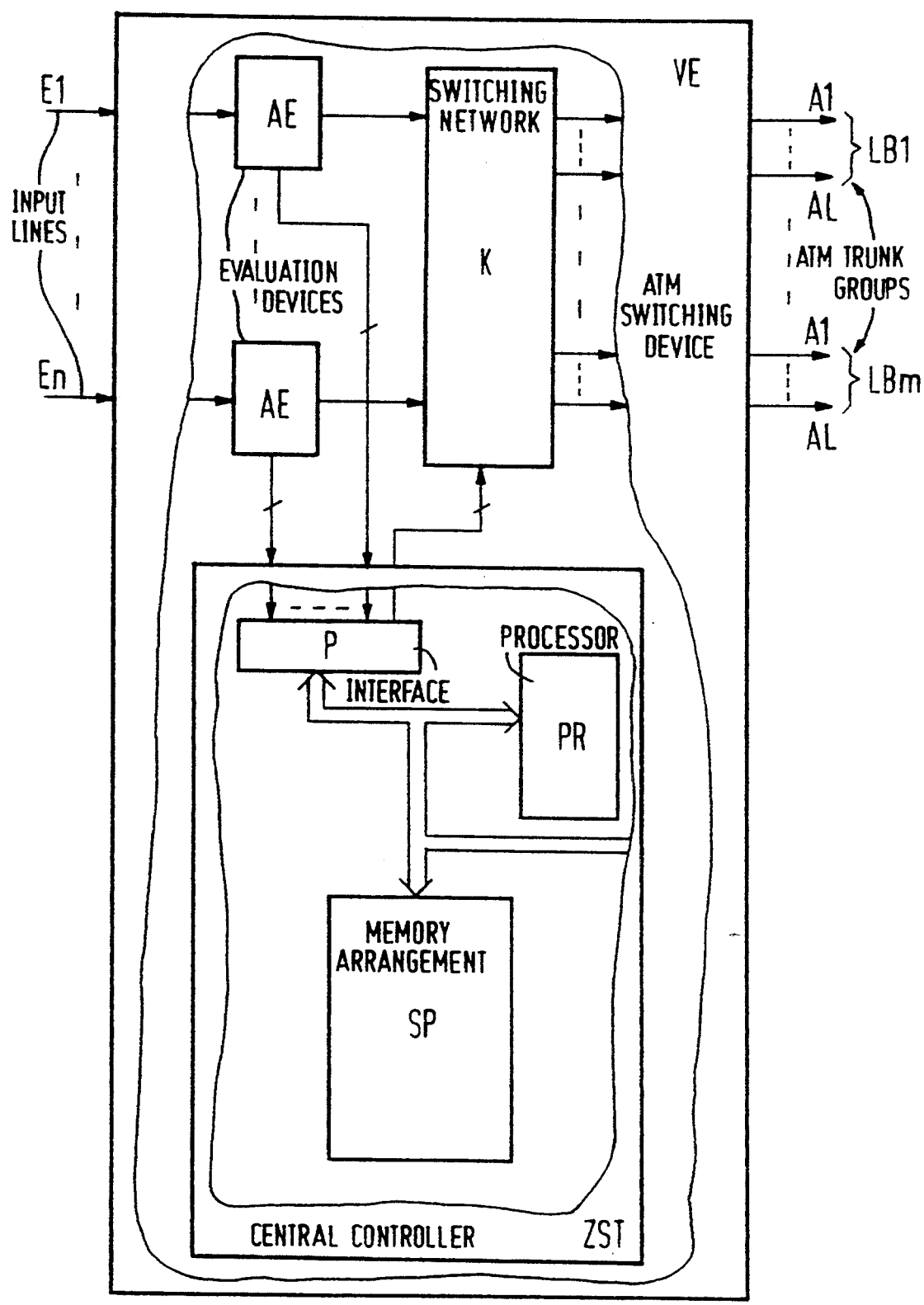

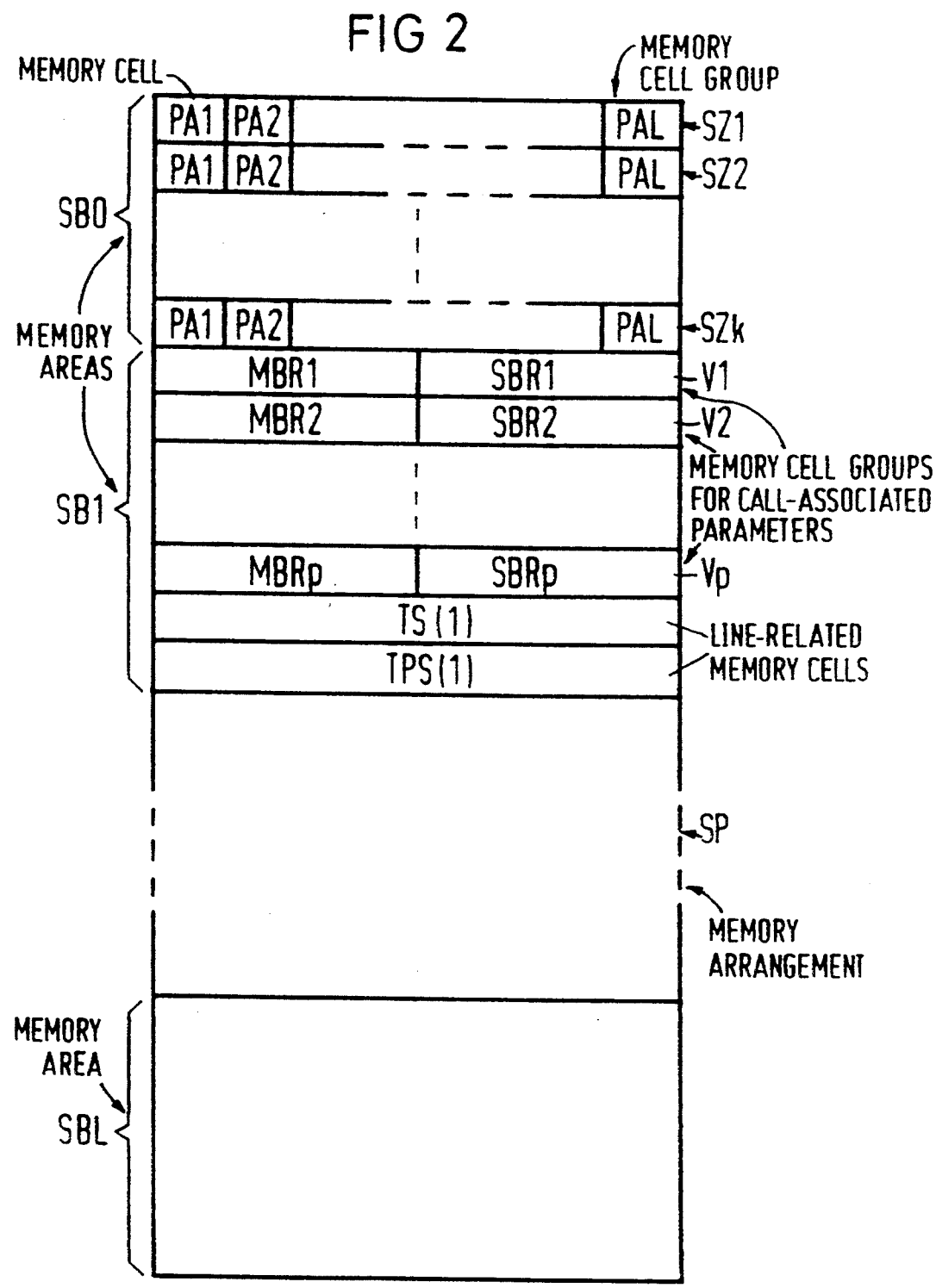

METHOD AND CIRCUIT ARRANGEMENT FOR SETTING UP VIRTUAL CONNECTIONS VIA AN ATM TRUNK GROUP

This is a continuation of application Ser. No. 07/913,969, filed Jul. 17, 1992 now abandoned.

FIELD OF THE INVENTION

The present invention relates to a method and a circuit arrangement for setting up virtual connections by at least one asynchronous transfer mode (ATM) trunk group. The ATM trunk group is designed for asynchronous transfer mode, and connects ATM communication devices together. The ATM trunk group is formed of a plurality of individual ATM trunks. The connection between the ATM equipment and the ATM trunk group is achieved by connecting one of the ATM communication device systems to a respective ATM trunk group, based on the measure of the characteristic parameters reported for the virtual connections to be set up, and based on the remaining free transmission capacity available on the individual ATM trunks.

BACKGROUND OF THE INVENTION

While setting up virtual connections in an ATM switching network operating according to an asynchronous transfer mode, separate path finding occurs within individual ATM switching equipment respectively, such that a suitable path for a virtual connection across the switching network belonging to the ATM switching equipment, can be defined. Given a multi-stage switching network having individual switching elements connected together by internal ATM links, such separate path finding occurs based on both the bit rate reported for the respective virtual connection, and the remaining bit rate transmission capacities that are momentarily available on the individual ATM links.

In addition to finding such an internal path within the ATM switching device, one of the individual ATM trunks of the ATM trunk group being considered must also be selected for a virtual connection to be set up when not only individual ATM trunk, but also external ATM trunk groups, formed of a plurality of individual ATM trunks, are provided within an ATM switching network between ATM communication devices. An individual ATM trunk is selected before finding the internal path within the respective ATM switching device.

SUMMARY OF THE INVENTION

It is an object of the present invention to provide a method and a circuit arrangement for selecting individual ATM trunks within an ATM group for setting up virtual connections with minimal control outlay.

The above object is inventively achieved in the method of the present invention. This method contemplates setting up virtual connections by means of at least one ATM trunk group. The ATM trunk group is designed for an asynchronous transfer mode and connects ATM communication devices together. The ATM trunk group is formed of a plurality of ATM trunks. The ATM communication equipment is connected to a respective ATM trunk based on a measure of the characteristic parameters reported for the virtual connections to be set up, and based on a measure of the remaining free transmission capacity available on the individual ATM trunks, respectively.

The method of the present invention is achieved in accordance with the following steps. First, characteristic parameters referring to size ranges of the parameters, and reported for virtual connections to be set up, are allocated to connection classes. Next, transmission classes corresponding to the connection classes are defined for individual ATM trunks of respective ATM trunk groups. Then, line particulars, referring to all of the transmission classes for which at least one virtual connection can be set up (based on the currently available free transmission capacity on a respective individual ATM trunk), are individually retained for associated individual ATM trunks. Finally, where a request for setting up a virtual connection is present, one of the individual ATM trunks is selected during a search procedure. The search procedure incorporates the line particulars of all of the individual ATM trunks. The line particulars yield a transmission class that corresponds to the connection class to be taken into consideration in making the virtual connection to be set up.

One advantage of the method of the present invention is that the control procedures necessary for selecting an individual ATM trunk belonging to an ATM trunk group while setting up a virtual connection amount to simple comparisons of the class allocated to the respective virtual connection to the line particulars that are individually maintained for each of the individual ATM trunks. Further, with every set up of a virtual connection, or cleardown of an established connection, on an individual ATM trunk, the line particulars only have to be updated where the free bit rate transmission capacity has varied due to a set up or cleardown of a virtual connection.

The method of the present invention can include reporting characteristic parameters for the individual virtual connections, such as the peak bit rate values, or average bit rate values and peak bit rate values.

Further, either connection classes or transmission classes are defined that differ based on different average bit rate values and/or different peak bit rate values.

Also, in accordance with the principles of the present invention, the remaining transmission capacity available for new virtual connections on an individual ATM trunk being considered is updated with every set up of a virtual connection, or cleardown of a virtual connection already set up, beginning with the transmission capacity on the individual ATM trunks already occupied by the virtual connections already set up. The individual transmission classes are updated in the following manner. A transmission bit rate value is formed for the individual ATM trunk based on the measure of the reported peak bit rate values or based on the measure of the reported average bit rate values and peak bit rate values, respectively, of all virtual connections already set up by means of the individual ATM trunk, and based on the measure of the peak bit rate values or average bit rate value and peak bit rate value corresponding to the respective transmission class. The respective transmission class is retained in the line particulars for the respective individual ATM trunk when the calculated transmission bit rate value is lower than or equal to a maximum transmission bit rate value defined for the individual ATM trunk, respectively.

Further, the transmission classes are allocated to at least one group of transmission classes, where a sequence of the associated transmission classes is defined in view of the significance of the associated transmission classes. A transmission bit rate value is separately calculated for a respective group of transmission classes. First, the highest of the associated transmission classes is taken into consideration in calculating a transmission bit rate value for a respective transmission group. The associated transmission class, and the transmission classes lower in comparison to the associated transmission class, are retained in the line particulars for the respective individual ATM trunk when the calculated transmission bit rate value is lower than or equal to a defined, maximum transmission bit rate value. When the maximum transmission bit rate value is exceeded by the calculated transmission bit rate value, the calculation of a transmission bit rate value is repeated with at least one transmission class of the respective transmission group that is lower in comparison to the associated transmission class. This calculation is repeated until a transmission bit rate value is calculated that is lower than or equal to the maximum transmission bit rate value.

In addition, a sum is formed of the average bit rate values for all virtual connections that are set up, and a product sum is updated with every set up or cleardown of a virtual connection when calculating a transmission bit rate value for an individual ATM trunk. A product value of the average bit rate value, and the difference between the peak bit rate value and the average bit rate value contained in the product sum for all the existing virtual connections is achieved in that the associated sum or product sum is expanded by the average bit rate value, or by a product value of the transmission bit rate class to be taken into consideration for the calculation of the transmission bit rate value. The product value corresponds to the product values contained in the product sum. A square root value of the expanded product sum, multiplied by a multiplication factor, is added to the expanded sum.

The above object is also achieved in a circuit arrangement for an ATM communications equipment for setting up virtual connections by means of at least one ATM trunk group that is designed for an asynchronous transfer mode, and that connects the associated ATM communication device to other ATM communication devices. An ATM trunk groups is formed of a plurality of individual ATM trunks based on a measure of the characteristic parameters reported for the virtual connections to be set up, and on a measure of the remaining free transmission capacity available on the individual ATM trunks, respectively.

The circuit arrangement of the present invention allocates the characteristic parameters reported for virtual connections to be set up to connection classes referring to size ranges of the characteristic parameters. Further, at least one memory having a plurality of memory cells is provided, and is allocated to one of the respective ATM trunk groups. The memory cells are individually allocated to transmission classes corresponding to the connection classes. A separate memory location is also provided, and is allocated within a memory cell for each of the individual ATM trunks belonging to a respective ATM trunk group. Further, defined marking information can always be entered into the separate memory location of the memory cell when at least one more virtual connection of the transmission class allocated to the respective memory cell can still be set up by the individual ATM trunk allocated to the respective memory location, based on the remaining free transmission capacity. In addition, given the presence of a request for setting up virtual connections, the memory cells can be individually driven based on the measure of the connection class allocated to the respective virtual connections. Further, the memory locations belonging to the recently driven memory cell are evaluated by an evaluation device with respect to both the presence of the defined marking information and the selection of one of the individual ATM trunks for setting up a virtual connection, in whose allocated memory location the defined marking information is entered.

Thus, one advantage of the circuit arrangement of the present invention is that only one of the memory cells within the occupied memory allocated to an ATM trunk group is addressed according to the measure of the class allocated to the virtual connection that is to be set up. Further, one of the individual ATM trunks (on which a transmission class corresponding to the connection class to be considered in the virtual connection requested) is available to be subsequently identified by evaluating the marking bits stored in the individual memory locations of this memory cell.

BRIEF DESCRIPTION OF THE DRAWINGS

FIG. 1 illustrates an exemplary embodiment of a block circuit diagram of an ATM switching device, structured in accordance with the principles of the present invention.

FIG. 2 illustrates one possible arrangement for the memory of FIG. 1.

DESCRIPTION OF THE PREFERRED EMBODIMENTS

As illustrated in FIG. 1, an ATM switching device (VE) is connected to a plurality of ATM input lines, E1 through En, and to a plurality of ATM trunk groups, LB1 through LBm. ATM input lines E1 and En, and ATM trunk groups LB1 and LBm are indicated in FIG. 1, whereas other input lines and trunk groups in these series, though not shown, are also present in FIG. 1. The ATM trunk groups are each formed of a plurality of individual ATM trunks, A1 through AL.

A transmission of message cells during the virtual connections occurs on the ATM input lines and individual ATM trunks, respectively, in accordance with an asynchronous transfer mode. The message cells can be cells having a fixed length, a cell header, and an information portion available to the cells in a known manner. The actual message signals are transmitted in the information part of the message cells. The term "message signals" refers to message and text signals, as well as voice or image signals, in digital form. A virtual connection on the ATM input line or individual ATM trunk being considered is identified by a virtual channel number contained in a cell header. Further, dummy cells corresponding to the message cells are transmitted in transmission pauses.

Although FIG. 1 only illustrates the beginning and end of the series of ATM input lines and individual ATM trunks, it is to be understood that each of the ATM input lines E1 through En has an evaluation device AE allocated to it, where the evaluation devices are commonly in communication with a central controller ZST, and individually in communication with one of the terminals of a switching network K. The ATM trunk groups LB1 through LBm are connected to the switching network. These ATM trunk groups can, for example, serve as trunk groups following an ATM switching device.

Each of the evaluation devices AE monitors the cell stream appearing on the allocated ATM input line, based on the appearance of cells which request the set up of virtual connections, and further forwards such cells to the central controller ZST. Upon the appearance of such a cell, the central controller selects, among other things, one of the individual ATM trunks belonging to the associated ATM trunk group when the current virtual connection requested is to be conducted by an external ATM trunk group. The control procedures required for this purpose are discussed in greater detail below.

After selecting an individual ATM trunk, the central controller ZST determines whether adequate transmission capacity remains within the switching network K for the respective connection. A virtual connection currently requested is set up, and the switching network K is appropriately driven by the central control when given an adequate transmission capacity for setting up the virtual connection. The particular functioning and the control of the switching network K are known to those of ordinary skill in the art and, therefore, will not be discussed in greater detail.

Where an adequate transmission capacity is not present, the requested virtual connection is rejected. When controlled by, for example, the central controller ZST, a cell having corresponding signaling information is transmitted to the subscriber equipment, which has requested the virtual connection, to transmit the information that the virtual connection has just been rejected. Again, such control processes occurring during a call set up are assumed to be known to those of skill in the art and, therefore, are only cursorily discussed herein.

As further illustrated in FIG. 1, the central controller ZST includes a processor PR connected to both an interface P and to at least one memory arrangement SP. The interface P is connected to outputs of the evaluation device AE and to control inputs of the switching network K. The interface P transfers or accepts data supplied by the individual evaluation means, and also outputs control information to the switching network K.

The exemplary memory arrangement SP is illustrated in greater detail in FIG. 2. The memory arrangement includes a plurality of memory cells SZ1 through SZk in a first memory area, referenced SB0. The memory area SB0 may, for example, be allocated to the ATM trunk group LB1 illustrated in FIG. 1. The memory cells SZ1 through SZk are allocated, respectively, to one of a total of k defined transmission classes. A total of L memory locations are provided within such a memory cell. The L memory locations are individually allocated to the individual ATM trunks A1 through AL belonging to the ATM trunk group LB1.

The memory arrangement SP also includes a plurality of identically organized memory areas, SB1 through SBL, corresponding in number to the plurality of individual ATM trunks A1 through AL belonging to the ATM trunk group LB1. Only the memory area SB1 allocated to the individual ATM trunk A1 is illustrated in detail, although the memory area SB1 is illustrative of other memory areas, SB2 through SBL. A plurality of memory cells corresponding to the maximum number of virtual connections that can be set up by the individual ATM trunk A1 belong to the memory area SB1. For example, given a maximum number p of possible virtual connections, p memory cells (such as V1 through Vp illustrated in FIG. 2) are provided for storing call-associated parameters (set forth in detail below). These parameters are referenced MBR and SBR1 for the memory cell V1, MBR2 and SBR2 for the memory cell V2, and MBRP and SBRP for the memory cell Vp, etc. Additionally, line-related memory cells TS(1) and TPS(1) are provided, as illustrated in FIG. 2. These line related memory cells provide immediate storage of line-related, traffic-dependent variables on which determinations (such as the availability for setting up a new virtual connection on an individual ATM trunk, such as A1) are made.

Memory areas SB2 through SBL are identical to the memory area SB1, and are individually allocated to the individual ATM trunks A2 through AL of the ATM trunk group LB1. These memory areas store particulars for the individual ATM lines that correspond to parameters such as call-associated parameters and line-related, traffic-dependent variables.

As described above, the memory areas SB0 through SBL are individually allocated to the ATM trunk group LB1. When, as illustrated in FIG. 1, further ATM trunk groups (LB2 through LBm) are connected to the ATM switching device VE in addition to the ATM trunk group LB1, memory areas SB0 through SBL can be followed by additional memory areas, where call-associated parameters and line-related, traffic-dependent variables can be stored for additional ATM trunk groups. Alternatively, separate memories having memory areas corresponding to the memory areas SB0 through SBL can also be provided for additional ATM trunk groups, where the memories are connected to the bus system of the processor PR illustrated in FIG. 1.

A circuit arrangement constructed in accordance with the principles of the present invention operates as follows.

In order to initiate the set up of a virtual connection over one of the input lines E1 through En, signaling cells are transmitted from a calling subscriber device connected to an input line, such as E1, to the switching device VE in a signaling phase. The set up for a virtual connection is requested and the desired virtual connection is specified by the signaling cells. These signaling cells contain, among other things, call-characterizing parameters from transmission of message cells that can proceed following a successful call set up. As assumed by the example below, these parameters are the peak bit rate value and the average bit rate value. The peak bit rate value and average bit rate value cannot be exceeded by the message cells transmitted during the course of an established connection. These parameters, however, can also consist of only a peak bit rate value, or of a peak bit rate value, an average bit rate value and a maximum burst length.

Once the peak bit rate value and average bit rate value have been reported for a virtual connection, the central controller ZST determines whether the respective virtual connection can be set up, based on the remaining transmission capacity currently available within the switching network k. However, if the virtual connection is to be conducted via an ATM trunk group, the central controller selects one of the individual ATM trunks belonging to the ATM trunk group (prior to the request for the virtual connection that is to be set up) based on the peak bit rate and average bit rate values reported for the respective virtual connection.

The selection of an individual ATM trunk within an ATM trunk group while setting up virtual connections by the central controller ZST is discussed by way of example in greater detail below with reference to the ATM trunk group LB1. Corresponding control processes sequence for further ATM trunk groups.

In order to select an individual ATM trunk within an ATM trunk group while minimizing the control outlay, call classes are established. The call classes are arbitrarily defined ranges of peak bit rate values and average bit rate values for the individual virtual connections. The individual call classes can have different peak bit rate values and/or average bit rate values. As previously set forth with reference to FIG. 2, a plurality of k different call classes are defined as an example.

The remaining free transmission capacities available to the individual ATM trunks of the ATM trunk group LB1, as a result of the momentary traffic volume, are allocated to transmission classes that correspond to one of the aforementioned call classes, respectively, based on their defined peak bit rate and average bit rate values. One of the memory cells SZ1 through SZk of the memory arrangement SP illustrated in FIG. 2 is allocated to each of the transmission classes. A memory location in the form of a bit position, for example, is provided within these memory cells, respectively, for each of the individual ATM trunks belonging to the ATM trunk group LB1. These memory locations are referenced PA1 through PAL in FIG. 2, and correspond to the allocated individual ATM trunks A1 through AL.

Thus, marking information is always stored in a memory location within a memory cell when the free transmission capacity corresponding to the respective transmission class remains available on the allocated, individual ATM trunk, considering momentary traffic volume. In the above example, the memory locations are determined by a bit position in each of the memory cells. Thus, the allocated bit for an individual ATM trunk within a memory cell (SZ1 through SZk) is set to a defined binary value, such as logical "1", when the transmission capacity corresponding to the respective transmission class is available on the memory cell. Updating the bits allocated to an individual ATM trunk in the individual memory cells SZ1 through SZk thereby occurs, as set forth in detail below, with every set up or cleardown of a virtual connection. Thus, at every change of the momentary traffic volume on the respective individual ATM trunk, the bits allocated to an individual ATM trunk are updated.

When signaling cells requesting the set up of a virtual connection are supplied from the evaluation device AE to the processor PR of the central controller ZST, the processor PR first identifies the connection class being considered, based on the peak bit rate value and average bit rate value of the signaling cells. Once the connection class is identified, the memory cell (SZ1 through SZk) within the memory area SBO of the memory arrangement SP, corresponding to the transmission class and connection class previously identified, is driven to commence a polling cycle. During the polling cycle, all bits of the address memory cell are queried to determine when a defined binary value (logical "1") is present, based on a measure of the defined polling mode. For example, a polling mode can be defined such that all bits of the addressed memory cell are successively queried in a defined sequence. Then, the first of the individual ATM trunks whose allocated bit is set to the defined binary value is selected for the virtual connection to be set up. However, when the defined binary value is not identified for any of the bits during the polling cycle, the virtual connection to be set is rejected by the processor PR of the central controller ZST.

The above-described control processes for setting up a virtual connection within the ATM trunk group LB1 are repeated in the central controller ZST for every virtual connection that is to be set up via the ATM trunk group LB1.

Also, control processes corresponding to the previously described control processes sequence when virtual connections are to be set up by other ATM trunk groups, LB2 through LBm, connected to the ATM switching device VE illustrated in FIG. 1.

Further, successive polling cycles in the same memory cell of the memory area SBO allocated to, for example, the ATM trunk group LB1, can sequence such that the queries of the individual bits of the respective memory cell are carried out in successive polling cycles within a fixed zero point. That is, beginning with the same bit, and with an unchanging sequence. However, the queries can also be carried out in some other way, such as by querying with a variable zero position and/or with a variable sequence. Given a variable zero position, the query of the bits of a memory cell within a polling cycle can begin, for example, with the bit that follows the bit previously queried in the preceding polling cycle. In other words, the query during a polling cycle within a memory cell begins with, for example, the individual ATM trunk that follows the individual ATM trunk that had been selected in the ATM trunk group LB1 during the preceding polling cycle for setting up a virtual connection. Thus, a uniform workload of the individual ATM trunks belonging to an ATM trunk group is achieved.

As previously mentioned, the bits allocated to the individual ATM trunks A1 through AL of the ATM trunk group LB1 in the memory area SBO of the memory arrangement SP, illustrated in FIG. 2, are updated, as set forth below by way of example with respect to the individual ATM trunk A1. It can be assumed, with respect to the example, that a statistical multiplexing of message cells is provided on this individual ATM trunk. The peak bit rate values and average bit rate values, communicated to the processor PR of the central controller while setting up virtual connections, are stored in a call-associated manner when a successful call is set up by the individual ATM trunk A1. The memory cells V1 through Vp are available for storing the call-associated information in the memory area SB1 allocated to the individual ATM trunk A1. The memory cells V1 through Vp are individually allocated to the p possible virtual connections that are set up. The processor PR of the central controller ZST then forms a partial sum of the average bit rate values that can be stored in the memory cells V1 through Vp. That is, the processor PR sums up the average bit rate values stored in the memory cells V1 through Vp as parameters MBR1 through MBRp. This partial sum is then stored in the memory cell referenced TS(1) in the memory area SB1, and is updated by adding to or subtracting from the parameter being considered at every set up or cleardown of a virtual connection.

For each existing virtual connection, the processor PR forms a product value of the average bit rate value, and the difference between the peak bit rate value and the average bit rate value. Thus, a product value is formed from the parameter MBR1 and the difference between the parameters SBR1 and MBR1 for, e.g., the virtual connection to which the memory cell V1 is allocated. The individual product values are then added up to form a partial product sum, and are stored in the memory cell referenced TRS(1) subtracting from, respectively, the product value to be considered upon every set up or cleardown of a virtual connection on the individual ATM trunk A1.

Once the partial sum and the partial product sum are updated for an individual ATM trunk, such as individual ATM trunk A1, as set forth by way of example above, the processor PR determines whether at least one new virtual connection can be set for the associated transmission class by determining the peak bit rate value and average bit rate value for the highest of the possible transmission classes. In order to make this determination, the processor PR adds the average bit rate value for the associated transmission class to the partial sum already stored for the individual ATM trunk A1, thus forming an aggregate sum. A product value, added to the partial product sum already stored in order to form an aggregate product sum, is also calculated in the above-described manner for the associated transmission class.

The processor PR then forms a square root value from the aggregate product sum, and multiplies the square root value by a multiplication factor. The aggregate sum is subsequently added to the intermediate result achieved by forming a square root value from the aggregate product sum and multiplying the square root value by a multiplication factor. A comparative value is thus determined, and is compared to a defined transmission bit rate that corresponds to the maximum possible transmission bit rate on an individual ATM trunk, such as A1. When the transmission bit rate is greater than or equal to the comparative value previously calculated, the bit allocated to the individual ATM trunk, such as A1, is set to the defined binary value (logical "1") in the respective memory cell, such as SZ1 through SZk illustrated in FIG. 2, allocated to the transmission class under consideration, and in the memory cells that are allocated to the lower transmission classes. All of the transmission classes for which a virtual connection can be set up are then marked for this individual ATM trunk, and updating of the memory area SBO of the memory SP is terminated for the individual ATM trunk, such as A1.

However, when the defined transmission bit rate is exceeded by the comparative value previously formed, the processor PR repeats the control processes required to form a comparative value, by taking the next lowest transmission class and comparing it to the previous transmission class considered. This process is continued until the processor PR has calculated a comparative value that is lower than or equal to the transmission bit rate defined for the individual ATM trunk, such as A1. However, when a comparative value that is greater than the transmission bit rate is defined, none of the bits allocated to the individual ATM trunk, such as A1, in the memory area, such as SBO, is set to the defined binary value. This means that momentarily, no further virtual connections can be set up by means of this individual ATM trunk.

In the above-described comparative value calculation, it was assumed that a sequence can be defined for all transmission classes based on the definition of the significance of the individual transmission classes. However, depending on the definition of the individual transmission classes, it is possible that different groups are to be formed for the transmission classes, and the sequence for the transmission classes would be defined in the different groups. For example, a separate group of transmission classes can be provided for each of the peak bit rates that determines the transmission classes. Within a respective group, a sequence is defined in view of the significance of the transmission classes under consideration, based on the measure of the average bit rates defined for these transmission classes. A comparative value is then separately formed in succession for the individual groups, respectively. The sequence defined for the transmission classed corresponds to the size of the parameters defining the transmission classes. For example, the transmission class corresponding to the highest of the parameters represents the highest transmission class and thus has the highest significance. The individual transmission classes are respectively defined by two parameters, namely a specific bit rate value and an average bit rate value. The transmission classes having the same peak bit rate value are combined into a group. A sequence is then defined within a group for the individual transmission classes corresponding the size of the average bit rate value. Thus, the transmission class having the highest average bit rate within a group forms the highest transmission class of the group and consequently has the highest significance in the group.

The control processes for updating of the memory area, such as SBO of FIG. 2, set forth above with reference to an individual ATM trunk, such as A1, are also executed for other individual ATM trunks of the ATM trunk group LB1 when the momentary traffic volume on these individual ATM trunks changes as a result of a set up or cleardown, respectively, of virtual connections.

Control processes that correspond to the control processes set forth for updating the memory area are also provided for updating the memories that are allocated to the other ATM trunk groups, such as LB2 through LBm illustrated in FIG. 1. The comparative value for determining the ability to set up a virtual connection by an individual ATM trunk can also be determined based on other criteria, rather than the criteria set forth in the above-described calculation of the comparative value. For example, it is possible that the peak bit rates reported for the individual virtual connections alone are taken into consideration for the calculation of a comparative value. In this case, a partial sum can be formed from the peak bit rates of the virtual connections currently set up by an individual ATM trunk, and can be intermediately stored in a memory area of the memory arrangement SP illustrated in FIG. 2 that is allocated to an associated individual ATM trunk. That is, a transmission bit rate corresponding to the reported peak bit rate is reserved for each of the connections set up by the associated individual ATM trunk. When updating this partial sum, due to a change in the traffic volume, a peak bit rate determinant for one of the defined transmission classes can then be added to the updated partial sum to form an aggregate sum. The aggregate sum resulting therefrom represents a comparative value that is used, rather than the previously-discussed comparative value for the comparison that is implemented by the processor PR.

Further, the selection of an individual ATM trunk within an ATM trunk group was described above with reference to an example including an ATM switching device. However, with the assistance of a memory arrangement allocated to a respective ATM trunk group, such a selection process can be undertaken in an ATM communication device of an ATM network, where virtual connections are to be conducted by at least one ATM trunk group. Examples of such ATM communications devices include an ATM interface device connected to terminal equipment, ATM concentrators, and an ATM multiplexer.

Further, it should be noted, with respect to the remaining transmission capacities available on the individual ATM trunks, that the transmission capacities are in fact stored in a memory arrangement allocated to the respective ATM trunk group for the selection of an individual ATM trunk within the ATM trunk group. However, a virtual connection can also be set up with an individual ATM trunk based on momentarily available, free transmission capacity that is individually retained for the individual ATM trunks of an ATM trunk group, with respect to all of the transmission classes for which the virtual connection is to be set up. Thus, during the course of setting up a virtual connection, a selection of an individual ATM trunk, or an updating of the line particulars relating to an individual ATM trunk, given a change in the traffic volume on one of the individual ATM trunks, occurs based on the individual line particulars in the course of setting up a virtual connection.

Although modifications and changes may be suggested by those skilled in the art, it is the intention of the inventors to embody within the patent warranted hereon all changes and modifications as reasonably and properly come within the scope of their contribution to the art.

We claim as our invention:

1. In an ATM communication system having a plurality of ATM subscriber devices selectively connected to each other by a selected trunk in one of a plurality of trunk groups, each trunk group emanating from an ATM switching device and containing a plurality of individual trunks, a method for selecting an individual trunk to complete a virtual connection between a requesting ATM subscriber device and another ATM subscriber device comprising the steps of:

said requesting subscriber device reporting characteristic parameters for said requesting subscriber device to said ATM switching device to initiate setting up of a virtual connection between said requesting subscriber device and another subscriber device;

allocating said characteristic parameters of said requesting subscriber device to one of a plurality of connection classes based on size ranges of said characteristic parameters of said requesting subscriber device;

defining a plurality of available transmission classes corresponding to said plurality of connection classes for the individual ATM trunks of said one of a plurality of trunk groups;

individually storing trunk particulars for all of said available transmission classes based on remaining free transmission capacity on each of said individual ATM trunks of said one of a plurality of trunk groups and thereby identifying an available plurality of individual ATM trunks suitable for making said virtual connection;

conducting a search for selecting one of said available plurality of said individual ATM trunks for setting up said virtual connection between said requesting subscriber device and another subscriber device, by making a comparison using said trunk particulars to identify a transmission class among said available transmission classes that corresponds to said one connection class; and setting up said virtual connection between said requesting subscriber station and another subscriber station on an individual ATM trunk having trunk particulars corresponding to the transmission class identified by said comparison.

2. A method according to claim 1, wherein said characteristic parameters reported for said virtual connections include peak bit rate values.

3. A method according to claim 1, wherein said characteristic parameters reported for said virtual connections include peak bit rate values and average bit rate values.

4. A method according to claim 2, wherein said transmission classes differ, and are defined by differences in said peak bit rate values.

5. A method according to claim 2, wherein said connection classes differ, and are defined by differences in said peak bit rate values.

6. A method according to claim 3, wherein said transmission classes differ, and are defined by differences in said average bit rate values and in said peak bit rate values.

7. A method according to claim 3, wherein said connection classes differ, and are defined by differences in said average bit rate values and in said peak bit rate values.

8. A method according to claim 1, further comprising the step of:

updating said remaining free transmission capacity for each of said individual ATM trunks being considered with every set up of one of said virtual connections.

9. A method according to claim 1, further comprising the step of:

removing said virtual connections by a cleardown of said virtual connections.

10. A method according to claim 9, further comprising the step of:

updating said remaining free transmission capacity for each of said individual ATM trunks being considered after every cleardown of one of said virtual connections.

11. A method according to claim 8, wherein said step of updating said remaining free transmission capacity for one of said individual ATM trunks further comprises the steps of:

forming a transmission bit rate value for said one of said individual ATM trunks based on both a measure of reported peak bit rate values for all virtual connections previously set up via said one of said individual ATM trunks and a measure of a transmission class peak bit rate value; and storing said transmission class in said trunk particulars for said one of said individual ATM trunks when said transmission bit rate value is less than or equal to a maximum transmission bit rate value defined for each of said individual ATM trunks.

12. A method according to claim 8, wherein said step of updating said remaining free transmission capacity for one of said individual ATM trunks further comprises the steps of:

forming a transmission bit rate value for said one of said individual ATM trunks, based on both a measure of a reported peak bit rate and average bit rate values for all virtual connections previously set up via said one of said individual ATM trunks and a measure of a transmission class peak bit rate and average bit rate value; and storing said transmission class in said trunk particulars for said one of said individual ATM trunks when said transmission bit rate value is less than or equal to a maximum bit rate value defined for each of said individual ATM trunks.

13. A method according to claim 11, wherein said transmission class is determined by the steps of:

calculating said transmission bit rate value, first based on the highest of said transmission classes;

storing the highest of said transmission classes and transmission classes lower than said highest of transmission classes in said trunk particulars for said one of said individual ATM trunks when said calculated transmission bit rate value is less than or equal to said maximum transmission bit rate value; and repeating the calculation of said transmission bit rate value with at least one of said transmission classes that is lower when compared to said highest of transmission classes until said calculated transmission bit rate value is less than or equal to said maximum transmission bit rate value when said maximum transmission bit rate value is exceeded by said calculated transmission bit rate value.

14. A method according to claim 12, wherein said transmission class is determined by the steps of:

defining groups of transmission classes from said transmission classes;

defining a sequence of transmission classes in each of said groups of transmission classes based on the significance of the transmission classes associated to each of said groups of transmission classes;

separately calculating said transmission bit rate value for each of said groups of transmission classes;

calculating said transmission bit rate value for one of said groups of transmission classes, first based on the highest of the transmission classes associated to said one of said groups of transmission classes;

storing said highest of the transmission classes and transmission classes associated to said one of said group of transmission classes and lower than said highest of the transmission classes in said trunk particulars for said one of said individual ATM trunks when said calculated transmission bit rate value is less than or equal to said maximum transmission bit rate value; and repeating the calculation of said transmission bit rate value with at least one of said transmission classes associated to said one of said group of transmission classes that is lower when compared to said highest of transmission classes until said calculated transmission bit rate value is less than or equal to said maximum transmission bit rate value when said maximum transmission bit rate value is exceeded by said calculated transmission bit rate value.

15. A method according to claim 12, wherein said step of forming said transmission bit rate value further comprises the steps of:

forming a sum of said average bit rate values for all of said virtual connections set up;

forming a product sum for all of said virtual connections set up, said product sum including for each of said virtual connections, a product value of said average bit rate value and the difference between said peak bit rate value and said average bit rate value;

updating said sum and product sum with every set up or cleardown of one of said virtual connections;

expanding said sum and said product sum by the average bit rate value and a product value for said transmission class to be considered for calculating said transmission bit rate value, the product value corresponding to said product values contained in said product sum to form an expanded sum and an expanded product sum; and adding to said expanded sum a square root value of said expanded product sum multiplied by a multiplication factor.

16. In an ATM communication system having a plurality of ATM subscriber devices selectively connected to each other by a selected trunk in one of a plurality of trunk groups, each trunk group emanating from an ATM switching device and containing a plurality of individual trunks, the improvement, for selecting an individual trunk to complete a virtual connection between a requesting ATM subscriber device and another ATM subscriber device, comprising:

means in said switching device for receiving characteristic parameters from said requesting subscriber device associated with said requesting subscriber device for initiating setting up of a virtual connection between said requesting subscriber device and another subscriber device;

means in said switching device for allocating said characteristic parameters of said requesting subscriber device to one of a plurality of connection classes based on size ranges of said characteristic parameters of said requesting subscriber device;

means in said switching device for defining a plurality of available transmission classes corresponding to said plurality of connection classes for the individual ATM trunks of said one of a plurality of trunk groups;

means in said switching device for individually storing trunk parameters for all of said available transmission classes based on remaining free transmission capacity on each of said individual ATM trunks of said one of a plurality of trunk groups and for thereby identifying an available plurality of individual ATM trunks suitable for making said virtual connection;

means in said switching device for conducting a search for selecting one of said available plurality of said individual ATM trunks for setting up said virtual connection between said requesting subscriber device and another subscriber device, said means for conducting a search including means for making a comparison using said trunk particulars to identify a transmission class among said available transmission classes that corresponds to said one connection class; and means in said switching device for setting up said virtual connection between said requesting subscriber station and another subscriber station on an individual ATM trunk having trunk particulars corresponding to the transmission class identified by said means for making a comparison.

* * * * *